(12) United States Patent
Zhou et al.

(10) Patent No.: US 11,985,403 B2
(45) Date of Patent: May 14, 2024

(54) METHOD AND APPARATUS FOR PREVENTING HEAT DAMAGE TO THERMAL IMAGING CAMERA

(71) Applicant: HANGZHOU HIKMICRO SENSING TECHNOLOGY CO., LTD., Zhejiang (CN)

(72) Inventors: Yang Zhou, Zhejiang (CN); Zhenhua Xiao, Zhejiang (CN); Yunfei Tang, Zhejiang (CN); Liping Wang, Zhejiang (CN); Jianjun Xu, Zhejiang (CN); Yongyou Pan, Zhejiang (CN); Jun Liu, Zhejiang (CN); Peng Zhou, Zhejiang (CN)

(73) Assignee: HANGZHOU HIKMICRO SENSING TECHNOLOGY CO., LTD., Hangzhou (CN)

( * ) Notice: Subject to any disclaimer, the term of this patent is extended or adjusted under 35 U.S.C. 154(b) by 282 days.

(21) Appl. No.: 17/609,683

(22) PCT Filed: May 13, 2020

(86) PCT No.: PCT/CN2020/090062
§ 371 (c)(1),
(2) Date: Nov. 8, 2021

(87) PCT Pub. No.: WO2020/248761
PCT Pub. Date: Dec. 17, 2020

(65) Prior Publication Data
US 2022/0224812 A1    Jul. 14, 2022

(30) Foreign Application Priority Data
Jun. 11, 2019 (CN) .......................... 201910500156.9

(51) Int. Cl.
*H04N 23/52* (2023.01)
*G01J 5/00* (2022.01)
(Continued)

(52) U.S. Cl.
CPC .............. *H04N 23/52* (2023.01); *G01J 5/048* (2013.01); *G08B 21/182* (2013.01); *G01J 2005/0077* (2013.01)

(58) Field of Classification Search
CPC ...... H04N 23/52; H04N 17/002; H04N 23/81; H04N 5/33; G01J 5/048; G01J 2005/0077;
(Continued)

(56) References Cited

U.S. PATENT DOCUMENTS 9,102,776 B1 *  8/2015  Kostrzewa .............. G01J 5/026
10,375,385 B1 * 8/2019  Witzel ................. H04N 17/002
(Continued)

FOREIGN PATENT DOCUMENTS

CN       102740008       10/2012
CN       108347560        7/2018
(Continued)

OTHER PUBLICATIONS

Extended European Search Report issued in Corresponding European Application No. 20822196.0, dated May 2, 2022.
(Continued)

*Primary Examiner* — Fernando Alcon
(74) *Attorney, Agent, or Firm* — NORTON ROSE FULBRIGHT US LLP

(57) ABSTRACT

The embodiments of the present application provides a method and apparatus for preventing heat damage to a thermal imaging camera. The method includes: obtaining a thermal imaging picture of the thermal imaging camera; detecting whether the thermal imaging picture shows that a
(Continued)

```
obtaining a thermal imaging picture of a thermal imaging camera  — 201
                              ↓
detecting whether the thermal imaging picture shows that a high-
   temperature object appears in the screen of the thermal imaging  — 202
                           camera
                              ↓
 confirming that the thermal imaging picture shows that a high-
  temperature object appears in the screen, generating a heat damage  — 203
     alarm signal, and closing the baffle if the baffle is not closed
   currently, and starting a NUC timing of protection mechanism and
  executing the NUC operation when the duration of timing reaches a
     preset duration of the NUC timing of protection mechanism
``` high-temperature object appears in the picture of the thermal imaging camera; confirming that the thermal imaging picture shows that a high-temperature object appears in the picture, generating a heat damage alarm signal, and closing a baffle if the baffle is not closed currently. In the present application embodiments, after detecting a heat damage alarm signal, that is, after detecting that a high-energy radiating object enters an image picture, the baffle is closed immediately, thereby avoiding the risk of the sensor being permanently burnt due to directly face to the high-energy radiating object.

15 Claims, 4 Drawing Sheets

(51) Int. Cl.
*G01J 5/04* (2006.01)
*G08B 21/18* (2006.01)

(58) Field of Classification Search
CPC . G01J 5/0018; G01J 5/026; G01J 5/00; G08B 21/182
See application file for complete search history.

(56) References Cited

U.S. PATENT DOCUMENTS

| 2006/0249678 | A1* | 11/2006 | Wu | H04N 23/51 348/E5.025 |
| 2009/0079854 | A1* | 3/2009 | Mangoubi | G06T 5/007 348/251 |
| 2018/0234628 | A1* | 8/2018 | Kobayashi | H04N 23/667 |
| 2018/0352174 | A1* | 12/2018 | Kuybeda | H04N 23/23 |
| 2020/0351433 | A1* | 11/2020 | Lu | H04N 23/695 |
| 2023/0128886 | A1* | 4/2023 | Yun | H04R 1/028 348/164 |

FOREIGN PATENT DOCUMENTS

| GB | 2124447 | 11/1986 |
| JP | S60134673 | 7/1985 |
| JP | 2018056786 | 4/2018 |
| WO | WO 2019/141074 | 7/2019 |

OTHER PUBLICATIONS

International Search Report and Written Opinion issued in Corresponding Chinese Application No. PCT/CN2020/090062, dated Aug. 26, 2020 (English translation provided).

* cited by examiner

METHOD AND APPARATUS FOR PREVENTING HEAT DAMAGE TO THERMAL IMAGING CAMERA

CROSS-REFERENCE TO RELATED APPLICATIONS

The present application is a national phase application under 35 U.S.C. § 371 of International Application No. PCT/CN2020/090062, filed May 13, 2020, which claims priority to a Chinese patent application No. 201910500156.9 filed with the China National Intellectual Property Administration on Jun. 11, 2019, the contents of which applications are incorporated herein by reference in their entirety.

TECHNICAL FIELD

The application relates to the technical field of thermal imaging, in particular to a method and apparatus for preventing heat damage to thermal imaging camera.

BACKGROUND

The thermal imaging camera is a camera that detects infrared energy in a non-contact manner and converts the infrared energy into an electric signal through an image sensor so as to obtain image picture and temperature information.

The sun or other objects whose temperature is much higher than the temperature measurement range of the thermal imaging camera can cause the material characteristics of the image sensor in the thermal imaging camera to change, that is, cause the image sensor to be burnt, that is, cause the thermal imaging camera to be burnt, resulting in abnormal images collected by the thermal imaging camera and inaccurate temperature measurement; when the high-temperature object is moved out of the image picture, the non-uniformity correction is executed on the image picture to obtain a normal image picture. However, since the recovery of the material characteristics of the image sensor takes time, the image picture captured by the thermal imaging camera still shows traces that characterize the image sensor being burnt despite the non-uniformity correction of the image frames.

In order to prevent the thermal imaging camera from being burnt, the general method is to cut in and out an attenuation device with a known attenuation coefficient (such as a small hole or a uniform attenuation sheet). However, this method can only realize one-level temperature expansion, that is, to a certain extent, expand the temperature measurement range of the thermal imaging camera. For objects with extremely high temperature, such as the sun at high temperature of several thousand degrees, even if the attenuation device is used in the thermal imaging camera, a large amount of infrared energy still reaches the image sensor, causing the thermal imaging camera to be burnt. The method using the attenuation device cannot be used to prevent the thermal imaging camera from being burnt by the extremely high temperature object.

SUMMARY

The embodiments of the present application provides a method and apparatus for preventing heat damage to a thermal imaging camera to realize automatic and unlimited temperature range heat damage prevention of the thermal imaging camera. The technical solution of the embodiments of the present application is realized as follows:

In the first aspect, the present application provides a method for preventing heat damage to a thermal imaging camera, the method includes:

obtaining a thermal imaging picture of the thermal imaging camera;

detecting whether the thermal imaging picture shows that a high-temperature object appears in the picture of the thermal imaging camera;

confirming that the thermal imaging picture shows that a high-temperature object appears in the picture, generating a heat damage alarm signal, and closing a baffle if the baffle is not closed currently.

Optionally, after confirming that the thermal imaging picture shows that a high-temperature object appears in the picture, the method further comprises: starting a non-uniformity correction timing of protection mechanism, and executing a non-uniformity correction operation when a duration of the non-uniformity correction timing of protection mechanism reaches a preset duration of the non-uniformity correction timing of protection mechanism.

Optionally, after generating a heat damage alarm signal, the method further comprises:

A) when a user sets a state of the baffle, judging whether a current actual state of the baffle is consistent with the state of the baffle set by the user, if not, changing the current actual state of the baffle to the state of the baffle set by the user, and turning to step B; if yes, directly turning to step B;

B) judging whether the current actual state of the baffle is a closed state, if yes, starting a non-uniformity correction timing of protection mechanism, and executing non-uniformity correction operation when the duration of the non-uniformity correction timing of protection mechanism reaches the preset duration of the non-uniformity correction timing of protection mechanism.

Optionally, before closing a baffle if the baffle is not closed currently, the method further comprises: detecting whether the thermal imaging camera generates a heat damage alarm signal according to a heat damage prevention detection period;

and, the method further comprises:

if no heat damage alarm signal generated by the thermal imaging camera is detected when the heat damage prevention detection period arrives, opening the baffle under the condition that the current baffle is closed.

Optionally, after confirming that the thermal imaging picture shows that a high-temperature object appears in the picture, the method further comprises: starting a closing timing, and opening the baffle and eliminating the heat damage alarm signal when a duration of the closing timing reaches a preset duration of closing.

Optionally, the baffle is a dual-position baffle.

Optionally, after generating a heat damage alarm signal, the method further comprises:

starting a non-uniformity correction timing of recovery mechanism if the current baffle is in an open state when the heat damage alarm signal is eliminated, and executing an non-uniformity correction operation when a duration of the non-uniformity correction timing of recovery mechanism reaches a preset duration of the non-uniformity correction timing of recovery mechanism.

Optionally, the method further comprises:

after confirming that the thermal imaging picture shows that a high-temperature object appears in the picture, setting a heat damage mark, and setting the preset duration of the non-uniformity correction timing of recovery mechanism as a first duration of timing in a preset schedule of the non-uniformity correction timing of recovery mechanism, wherein the preset schedule of the non-uniformity correction timing of recovery mechanism comprises a plurality of sequentially increased duration of timing that are arranged in sequence;

and when the heat damage alarm signal is eliminated, judging whether there is a heat damage mark, if yes, executing the step of starting the non-uniformity correction timing of recovery mechanism if the current baffle is in an open state;

and after executing the non-uniformity correction operation when a duration of the non-uniformity correction timing of recovery mechanism reaches a preset duration of the non-uniformity correction timing of recovery mechanism, judging whether a current duration of the non-uniformity correction timing of recovery mechanism is a last duration of timing in the schedule of the preset non-uniformity correction timing of recovery mechanism; if yes, eliminating the heat damage mark; otherwise, setting the current duration of the non-uniformity correction timing of recovery mechanism as a next duration of timing in the preset schedule of the non-uniformity correction timing of recovery mechanism, and judging whether the thermal imaging camera generates a heat damage alarm signal; and if the thermal imaging camera does not generate a heat damage alarm signal, returning to the step of judging whether there is a heat damage mark.

In the second aspect, the present application provides an apparatus for preventing heat damage to a thermal imaging camera, including:

a heat damage alarm module configured to obtain a thermal imaging picture of the thermal imaging camera, detect whether the thermal imaging picture shows that a high-temperature object appears in a picture of the thermal imaging camera, and confirm that the thermal imaging picture shows that a high-temperature object appears in the picture, and generate a heat damage alarm signal;

a heat damage prevention module configured to close a baffle if the baffle of the thermal imaging camera is not closed currently when the heat damage alarm module generates a heat damage alarm signal.

Optionally, the heat damage prevention module is further configured to: after confirming that the thermal imaging picture shows that a high-temperature object appears in the picture, start a non-uniformity correction timing of protection mechanism, and execute non-uniformity correction operation when a duration of the non-uniformity correction timing of protection mechanism reaches a preset duration of the non-uniformity correction timing of protection mechanism.

Optionally, the heat damage prevention module is further configured to:

A) when a user sets a state of the baffle, judge whether a current actual state of the baffle is consistent with the state of the baffle set by the user, if not, change the current actual state of the baffle to the state of the baffle set by the user, and turn to step B; if yes, directly turn to step B;

B) judge whether the actual state of the current baffle is a closed state, if yes, start a non-uniformity correction timing of protection mechanism, and execute non-uniformity correction operation when the duration of the non-uniformity correction timing of protection mechanism reaches the preset duration of the non-uniformity correction timing of protection mechanism.

Optionally, the heat damage prevention module is further configured to: before closing a baffle if the baffle is not closed currently, detect whether the heat damage alarm module generates a heat damage alarm signal according to a heat damage prevention detection period; and if no heat damage alarm signal generated by the heat damage alarm module is detected when the heat damage prevention detection period arrives, open the baffle under the condition that the current baffle is closed.

Optionally, the heat damage prevention module is further configured to: after confirming that the thermal imaging picture shows that a high-temperature object appears in the picture, start a closing timing, and open the baffle and eliminate the heat damage alarm signal when a duration of the closing timing reaches a preset duration of closing.

Optionally, the baffle is a dual-position baffle.

Optionally, the heat damage prevention module is further configured to: after generating a heat damage alarm signal, start a non-uniformity correction timing of recovery mechanism if the current baffle is in an open state when the heat damage alarm signal is eliminated, and execute a non-uniformity correction operation when a duration of the non-uniformity correction timing of recovery mechanism reaches a preset duration of the non-uniformity correction timing of recovery mechanism.

Optionally, the heat damage prevention module is further configured to:

after confirming that the thermal imaging picture shows that a high-temperature object appears in the picture, set a heat damage mark, and set the preset duration of the non-uniformity correction timing of recovery mechanism as a first duration of timing in a preset schedule of the non-uniformity correction timing of recovery mechanism, wherein the preset schedule of the non-uniformity correction timing of recovery mechanism comprises a plurality of sequentially increased durations of timing that are arranged in sequence;

and when the heat damage alarm signal is eliminated, judge whether there is a heat damage mark, if yes, execute the step of starting the non-uniformity correction timing of recovery mechanism if the current baffle is in an open state;

and after executing the non-uniformity correction operation when a duration of the non-uniformity correction timing of recovery mechanism reaches a preset duration of the non-uniformity correction timing of recovery mechanism, judge whether a current duration of the non-uniformity correction timing of recovery mechanism is a last duration of timing in the schedule of the preset non-uniformity correction timing of recovery mechanism; if yes, eliminate the heat damage mark; otherwise, set the current duration of the non-uniformity correction timing of recovery mechanism as a next duration of timing in the preset schedule of the non-uniformity correction timing of recovery mechanism, and judge whether the thermal imaging camera generates a heat damage alarm signal; and if the thermal imaging camera does not generate a heat damage alarm signal, return to the step of determining whether there is a heat damage mark.

In the third aspect, the embodiments of the present application provides a thermal imaging camera, comprising a non-transitory computer-readable storage medium and a processor that can access the non-transitory computer-readable storage medium, the non-transitory computer-readable storage medium stores instructions that, when executed by a processor, cause the processor to execute steps of any one of the method of the first aspects provided above.

In the fourth aspect, the embodiments of the present application provides a non-transitory computer-readable storage medium, the non-transitory computer-readable storage medium stores instructions that, when executed by a processor, cause the processor to execute steps of any one of the method of the first aspects provided above.

In the fifth aspect, the present application provides a computer program, the computer program, when being executed by a processor, causes the processor to execute steps of any one of the method of the first aspects provided above.

In the present application, after detecting that the thermal imaging camera generates a heat damage alarm signal, it is determined whether the current blade is closed, if not, the baffle is closed, thereby realizing the automatic and unlimited temperature range heat damage prevention of the thermal imaging camera.

DETAILED DESCRIPTION

The present application will be further described in detail below in conjunction with the drawings and specific embodiments.

For ease of understanding, the following explanation is given.

Baffle: a uniform surface used by thermal imaging cameras to block the image sensor and block the imaging information from the lens, so that the image sensor will not interfered by the imaging information of the lens when executing non-uniformity Correction (NUC) on image pictures. When the baffle is in a close state, the baffle blocks imaging information from the lens; when the baffle is in an open state, the baffle does not block imaging information from the lens. Here, the imaging information includes infrared energy radiated from the object.

Single-position baffle: a baffle that is in an open state under normal conditions and can be closed only by continuously energizing the control coil, so that the baffle is in a close state.

Double-position baffle: a baffle that can change the state by energizing the control coil for a short time, that is, the baffle can be kept in an open state or a close state without continuously energizing the control coil.

Heat damage alarm signal: when an object radiating high infrared energy enters the image picture collected by the thermal imaging camera, alarm information is generated by an algorithm and used for informing that there is currently an object radiating high infrared energy in the image picture.

Heat damage mark: used for recording the current information that the image sensor is burnt, that is, recording the current information that thermal imaging camera is burnt.

NUC: by blocking imaging information from the lens in front of the image sensor, the heat radiation uneven signal inside the thermal imaging camera is collected and stored, and then the stored heat radiation uneven signal is removed as background data of an image picture during normal imaging to obtain an image picture which is not interfered by heat inside the thermal imaging camera, so that the thermal imaging camera outputs a normal image picture.

The thermal imaging camera can be an infrared thermal imaging camera. The thermal imaging camera consists of lens, image sensor, baffle and other parts. The position of the baffle is in front of the image sensor, so as to achieve the purpose of covering the image sensor to execute NUC on the image picture.

In order to solve the problem that the related technology cannot prevent the thermal imaging camera from being burnt by an object with extremely high temperature and realize automatic and unlimited temperature range heat damage prevention of the thermal imaging camera, the embodiments of the present application provide a method for preventing heat damage to a thermal imaging camera.

Figure 1:
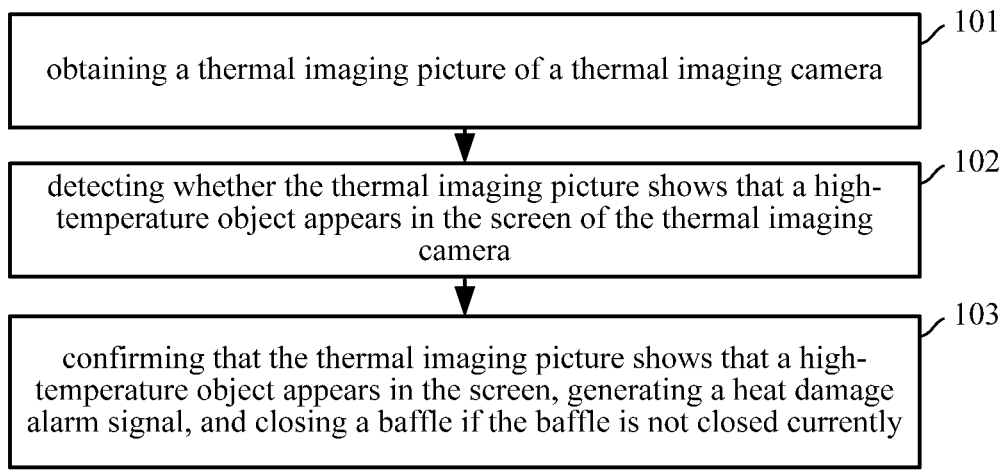
FIG. 1 is a first flow chart of a method for preventing heat damage to a thermal imaging camera provided by embodiments of the present application.

FIG. 1 is a first flow chart of a method for preventing heat damage to a thermal imaging camera provided by embodiments of the present application, and the specific steps are as follows.

Step 101: obtaining a thermal imaging picture of a thermal imaging camera.

Step 102: detecting whether the thermal imaging picture shows that a high-temperature object appears in the picture of the thermal imaging camera.

Step 103: confirming that the thermal imaging picture shows that a high-temperature object appears in the picture, generating a heat damage alarm signal, and closing a baffle if the baffle is not closed currently.

In the embodiments of the present application, if it is detected that the thermal imaging camera generates a heat damage alarm signal, it can be judged that the thermal imaging camera is burnt, specifically the image sensor of the thermal imaging camera is burnt, so that the baffle is closed. At the moment, no matter the energy of the imaging information, the baffle can block it, and any imaging information cannot reach the image sensor, so that it will not continue to cause burns to the image sensor, avoiding permanent damage to the image sensor, and realizing the automatic and unlimited temperature range heat damage prevention of the thermal imaging camera.

In step 101, the thermal imaging picture of the thermal imaging camera is the thermal imaging picture collected by the thermal imaging camera. The thermal imaging camera can collect thermal imaging pictures in real time. Specifically, imaging information enters the interior of the thermal imaging camera from the lens of the thermal imaging camera, and an image sensor of the thermal imaging camera generates a thermal imaging picture based on the imaging information entering the interior of the thermal imaging camera from the lens.

In step 102, the picture is an image picture of a thermal imaging picture. Detecting whether the thermal imaging picture shows that a high-temperature object appears in the picture of the thermal imaging camera may specifically be: the processor of the thermal imaging camera detects the thermal imaging picture and judges whether a high temperature object is appears in the image picture of the thermal imaging picture. Among them, a high temperature object can be understood as an object that radiates high infrared energy.

In step 103, the current baffle refers to the baffle at the current moment. Confirming that the thermal imaging picture shows that a high-temperature object appears in the picture, generating a heat damage alarm signal, and closing the baffle if the baffle is not closed currently based on the heat damage alarm signal, which specifically can be as follows: if the processor of the thermal imaging camera judges that a high-temperature object appears in the image picture of the thermal imaging picture, it generates a heat damage alarm signal, so that the baffle is in the closed state. In addition, based on the heat damage alarm signal, if the baffle is in the closed state at the current moment, the current baffle can be kept in the closed state.

Figure 2:
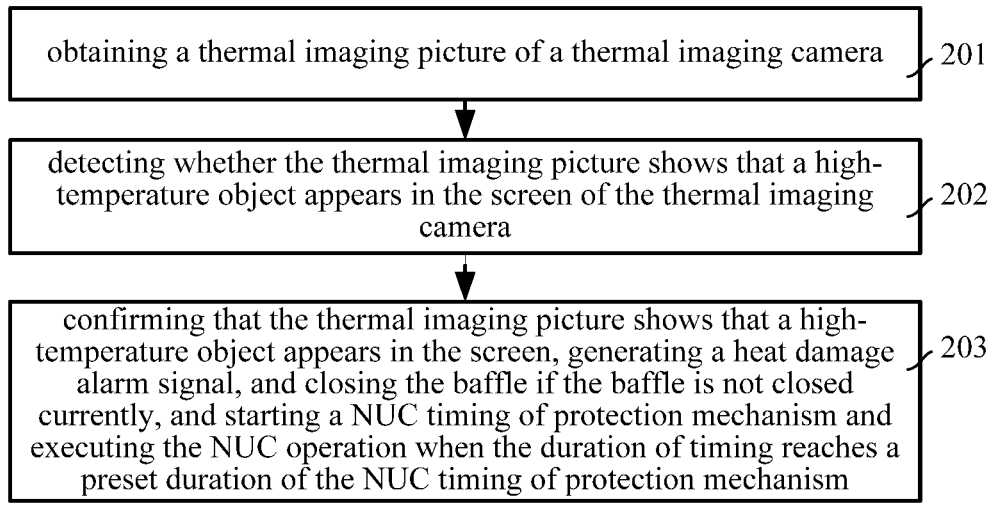
FIG. 2 is a second flow chart of a method for heat damage prevention heat damage prevention of a thermal imaging camera provided by embodiments of the present application.

FIG. 2 is a second flow chart of a method for heat damage prevention of a thermal imaging camera provided by embodiments of the present application, and the specific steps are as follows.

Step 201: obtaining a thermal imaging picture of a thermal imaging camera.

Step 202: detecting whether the thermal imaging picture shows that a high-temperature object appears in the picture of the thermal imaging camera.

Step 203: confirming that the thermal imaging picture shows that a high-temperature object appears in the picture, generating a heat damage alarm signal, and closing the baffle if the baffle is not closed currently, and starting a NUC timing of protection mechanism and executing the NUC operation when a duration of timing reaches a preset duration of the NUC timing of protection mechanism. Protection mechanism means a mechanism for protecting the camera from being permanently burnt: when the thermal imaging picture shows that a high-temperature object appears in the picture, making the baffle in the closed status, thereby to protect the camera from being burnt further by the high-temperature object.

The above step 201 is the same as step 101, and the above step 202 is the same as step 102, which are not described again.

In step 203, in case that it is judges that a high temperature object appears in the image picture of the thermal imaging picture, the processor generates a heat damage alarm signal, and closes the baffle if the current baffle is in the open state based on the heat damage alarm signal, so that the baffle is in the closed state. In addition, the NUC timing of protection mechanism is activated based on the heat damage alarm signal while the operation of closing the baffle is executed based on the heat damage alarm signal. When the duration of the NUC timing of protection mechanism reaches the preset duration of the NUC timing of protection mechanism, it can be judged that the baffle is completely in a closed state, at the moment, the NUC is executed on the image picture without being interfered by imaging information of the lens, and the processor executes NUC operation on the image picture.

In an embodiment of the present application, in step 203, after generating the heat damage alarm signal, it may further include:

A) when a user sets a state of the baffle, judging whether the current actual state of the baffle is consistent with the state of the baffle set by the user, if not, changing the current actual state of the baffle to the state of the baffle set by the user, and turning to step B; if yes, directly turning to step B;

B) judging whether the current actual state of the baffle is a closed state, if yes, starting a NUC timing of protection mechanism, and executing NUC operation when the duration of the NUC timing of protection mechanism reaches the duration of the preset NUC timing of protection mechanism.

In an embodiment of the present application, in step 203, before closing the baffle if the baffle is not closed currently, the method may further include: detecting whether the thermal imaging camera generates a heat damage alarm signal according to the heat damage prevention detection period. If the heat damage alarm signal generated by the thermal imaging camera is detected when a heat damage prevention detection period arrives, the baffle is closed under the condition that the baffle is not closed currently. If no heat damage alarm signal generated by the thermal imaging camera is detected when the heat damage prevention detection period arrives, the baffle is opened under the condition that the current baffle is closed; if the current baffle is in the open state, the open state of the current baffle can be kept.

In an embodiment of the present application, in step 203, closing the baffle can further include: starting a closing timing, opening the baffle and eliminating the heat damage alarm signal when a duration of closing timing reaches a preset duration of closing.

Specifically, generating a heat damage alarm signal in a case where it is judged that a high-temperature object is appears in the image picture of the thermal imaging picture. Based on the heat damage alarm signal, closing the baffle if the baffle is not closed currently, and based on the heat damage alarm signal, starting a closing timing, and opening the baffle and eliminating the heat damage alarm signal when the duration of the closing timing reaches the preset duration of closing.

In an embodiment of the present application, after generating the heat damage alarm signal, the step 203 may further include: starting a NUC timing of recovery mechanism if the current baffle is in an open state when the heat damage alarm signal is eliminated, and executing the NUC operation when the duration of the NUC timing of recovery mechanism reaches the preset duration of the NUC timing of recovery mechanism.

Specifically, after the heat damage alarm signal is generated, it is judged that the image sensor of the thermal imaging camera is burnt, and the material characteristics of the image sensor are changed. After the heat damage alarm signal is eliminated, if the current baffle is in the open state, a NUC timing of recovery mechanism is started. And when the duration of the NUC timing of recovery mechanism reaches the preset duration of the NUC timing of recovery mechanism, it can be judged that the material characteristics of the image sensor of the thermal imaging camera are recovered, and the NUC operation is executed on the image picture. Recovery mechanism means a mechanism through which the camera recovers to normal status: after the heat damage alarm signal is eliminated, implementing a NUC operation to the image picture by means of the image sensor whose material characteristics are recovered, to thereby recover the image picture of the camera to the normal status.

In an embodiment of the present application, generating the heat damage alarm signal may further include: setting a heat damage mark, and setting the preset duration of the NUC timing of recovery mechanism as a first duration of timing in a preset schedule of the NUC timing of recovery mechanism, wherein the preset schedule of the NUC timing of recovery mechanism contains a plurality of sequentially increased timing durations that are arranged in sequence;

moreover, when the heat damage alarm signal is eliminated, it may also include: judging whether a heat damage mark exists, if yes, executing the action of starting a NUC timing of recovery mechanism if the current baffle is open;

moreover, the executing the NUC operation when the duration of the NUC timing of recovery mechanism reaches the duration of the preset NUC timing of recovery mechanism may further include:

judging whether the current duration of the preset NUC timing of recovery mechanism is the last duration of timing in the preset schedule of the NUC timing of recovery mechanism, and if yes, eliminating the heat damage mark; otherwise, setting the preset duration of the NUC timing of recovery mechanism as the next duration of timing in the preset schedule of the NUC timing of recovery mechanism, judging whether the thermal imaging camera generates a heat damage alarm signal, and if the thermal imaging camera does not generate a heat damage alarm signal, returning to the action of judging whether the heat damage mark exists.

Specifically, generating a heat damage alarm signal in a case where it is judged that a high-temperature object is appears in the image picture of the thermal imaging picture. And under the condition that a heat damage alarm signal is detected, setting a heat damage mark, and setting the first duration of timing in a preset schedule of the NUC timing of recovery mechanism as the preset duration of the NUC timing of recovery mechanism.

When the heat damage alarm signal is eliminated, that is, when the baffle is opened, it is judged whether a heat damage mark exists. If the heat damage mark exists, executing the operation of starting a NUC timing of recovery mechanism if the current baffle is opened. And executing the NUC operation when the duration of the NUC timing of recovery mechanism reaches the preset duration of the NUC timing of recovery mechanism.

After the NUC operation is executed when the duration of the NUC timing of recovery mechanism reaches the preset duration of the NUC timing of recovery mechanism, judging whether the current preset duration of the NUC timing of recovery mechanism is the last duration of timing in the preset schedule of the NUC timing of recovery mechanism. If yes, eliminating the heat damage mark; otherwise, continuously detecting whether a heat damage alarm signal is generated. If a heat damage alarm signal is detected, namely, a high-temperature object is still detected in the image picture, a heat damage mark is continuously set, and the next duration of timing in the preset schedule of the NUC timing of recovery mechanism is set as the preset duration of the NUC timing of recovery mechanism.

Figure 3:
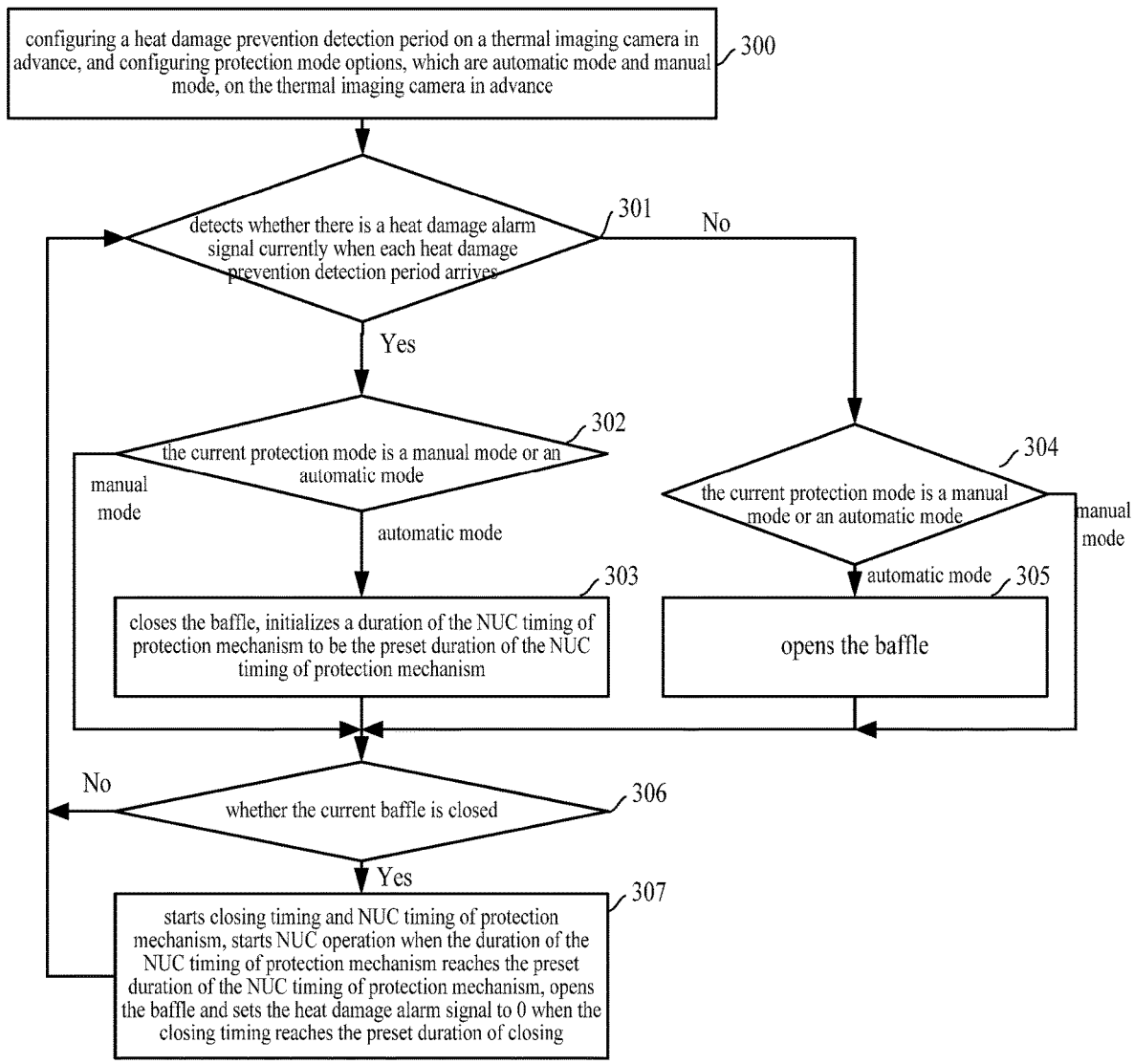
FIG. 3 is a first flow chart of a method for recovering from a heat damage of a thermal imaging camera provided by embodiments of the present application.

FIG. 3 is a first flow chart of a method for heat damage prevention of a thermal imaging camera provided by embodiments of the present application, and the specific steps are as follows:

Step 300: configuring a heat damage prevention detection period on a thermal imaging camera in advance, and configuring protection mode options, which are automatic mode and manual mode, on the thermal imaging camera in advance.

There are two kinds of baffle states: open state and closed state. When the protection mode is manual mode, the baffle state is completely judged and set by a user, namely the user sets the baffle state on the thermal imaging camera, and the thermal imaging camera executes opening or closing operation on the baffle according to the baffle state set by the user.

Step 301: the thermal imaging camera detects whether there is a heat damage alarm signal currently when each heat damage prevention detection period arrives, if yes, execute step 302; otherwise, execute step 304.

When a high-temperature object enters the collection range of the thermal imaging camera, the gray scale of an image collected by the thermal imaging camera will change. In the embodiment of the present application, it can be judged whether the heat damage alarm signal is generated by comparing the gray level of each pixel point of the image picture with a preset gray level threshold.

Step 302: the thermal imaging camera judges whether the current protection mode is a manual mode or an automatic mode, if the current protection mode is the manual mode, execute step 306; if it is the automatic mode, execute step 303.

Step 303: the thermal imaging camera closes the baffle, initializes a duration of the NUC timing of protection mechanism to be the preset duration of the NUC timing of protection mechanism, and turn to step 306.

Step 303 is: the thermal imaging camera closes the baffle, initializes the duration of the NUC timing of protection mechanism for judging whether the duration of timing reaches the preset duration of the NUC timing of protection mechanism.

Step 304: the thermal imaging camera judges whether the current protection mode is a manual mode or an automatic mode, if the current protection mode is the manual mode, execute step 306; if it is the automatic mode, execute step 305.

Step 305: the thermal imaging camera opens the baffle.

Step 306: the thermal imaging camera judges whether the current baffle is closed, if yes, execute step 307; otherwise, return to step 301.

Step 307: the thermal imaging camera starts closing timing and NUC timing of protection mechanism, starts NUC operation when the duration of the NUC timing of protection mechanism reaches the preset duration of the NUC timing of protection mechanism, opens the baffle and sets the heat damage alarm signal to 0 when the closing timing reaches the preset duration of closing, and returns to the step 301.

The above setting the heat damage alarm signal to 0 is to eliminate the heat damage alarm signal.

Considering that the operation of changing the state of the baffle (i.e. opening or closing the baffle) takes a certain time, in order to avoid erroneous judgement of the actual state of the baffle during the operation time, in an embodiment of the present application, a setting state parameter of baffle is added. Moreover, when the protection mode is the manual mode, the value of this parameter is completely set by the user. When the protection mode is the automatic mode, it is set by the thermal imaging camera according to the actual situation, specifically:

In step 303, the thermal imaging camera first sets the value of the setting state parameter of the baffle to a closed value, and then executes the operation of closing the baffle.

In step 305, the thermal imaging camera first sets the value of the setting state parameter of the baffle to an open valve, and then executes the operation of opening the baffle.

In an embodiment, a step 3052 is added between step 305 and step 306: the thermal imaging camera judges whether the current actual state of the baffle is consistent with the setting state of the baffle, if yes, directly execute step 306; otherwise, execute corresponding opening or closing operations on the baffle according to the setting state of the baffle, so that the actual state of the baffle is consistent with the setting state of the baffle, and then execute step 306.

In an embodiment, step 303 may specifically be: the thermal imaging camera sets the setting state of the baffle to be a closed state, closes the baffle, initializes the duration of the protection mechanism NUC, and turns to step 306.

Step 305 may specifically be: the thermal imaging camera sets the setting state of the baffle into an open state to open the baffle.

In addition, in the case that it is judged in steps 302 and 304 that the current protection module is in the manual mode, or after the duration of the NUC timing of protection mechanism is initialized in step 303, or after the baffle is opened in step 305, the thermal imaging camera can judge whether the current actual state of baffle is consistent with the setting state of the baffle. If yes, directly execute step 306; otherwise, execute corresponding opening or closing operations on the baffle according to the setting state of the baffle, so that the actual state of the baffle is consistent with the setting state of the baffle, and then execute step 306.

The embodiment shown in FIG. 3 is suitable for a thermal imaging camera using a dual-position baffle. The reason is as follows: when the single-position baffle is controlled to be closed, the control coil of the baffle needs to be energized, however, energizing the control coil for a long time will cause the temperature inside the thermal imaging camera to rise, resulting in inaccurate temperature measurement and affecting the core functions of this type of thermal imaging camera. When the above process generates a heat damage alarm signal, it is necessary to close the baffle, and if the control coil is energized for a long time to keep the closed state of the baffle, it will cause the problem of inaccurate temperature measurement, so that the embodiment is not suitable for the thermal imaging camera using a single-position baffle.

For thermal imaging camera using a dual-position baffle, the baffle can be controlled to be in an open or closed state all the time without energizing the control coil for a long time, and the temperature measurement function will not be affected by the temperature rise inside the thermal imaging camera due to the continuous energization of the control coil. Therefore, after detecting that a high-energy radiating object enters the picture, the automatic and unlimited temperature range heat damage prevention of the thermal imaging camera can be realized through the above embodiments without affecting the temperature measurement function of the thermal imaging camera.

Through the above embodiments, when the thermal imaging camera is in the automatic protection mode, if a heat damage alarm signal is detected, that is, after a high-energy radiating object enters an image picture, the baffle is closed, thereby avoiding the risk of the sensor being permanently burnt due to directly face to the high-energy radiating object. In addition, NUC operation is executed in the process of keeping the baffle closed, so that the problem of abnormal image pictures and inaccurate temperature measurement caused by temporary heat damage is corrected, ensuring that the temperature measurement function of the thermal imaging camera is normal when the baffle is opened again, and ensuring that the collected image pictures are normal.

After the thermal imaging camera generates a heat damage alarm signal, in order to repair the performance of the camera sensor in time, the embodiments of the present application provide the following post-heat damage recovery solution.

Figure 4:
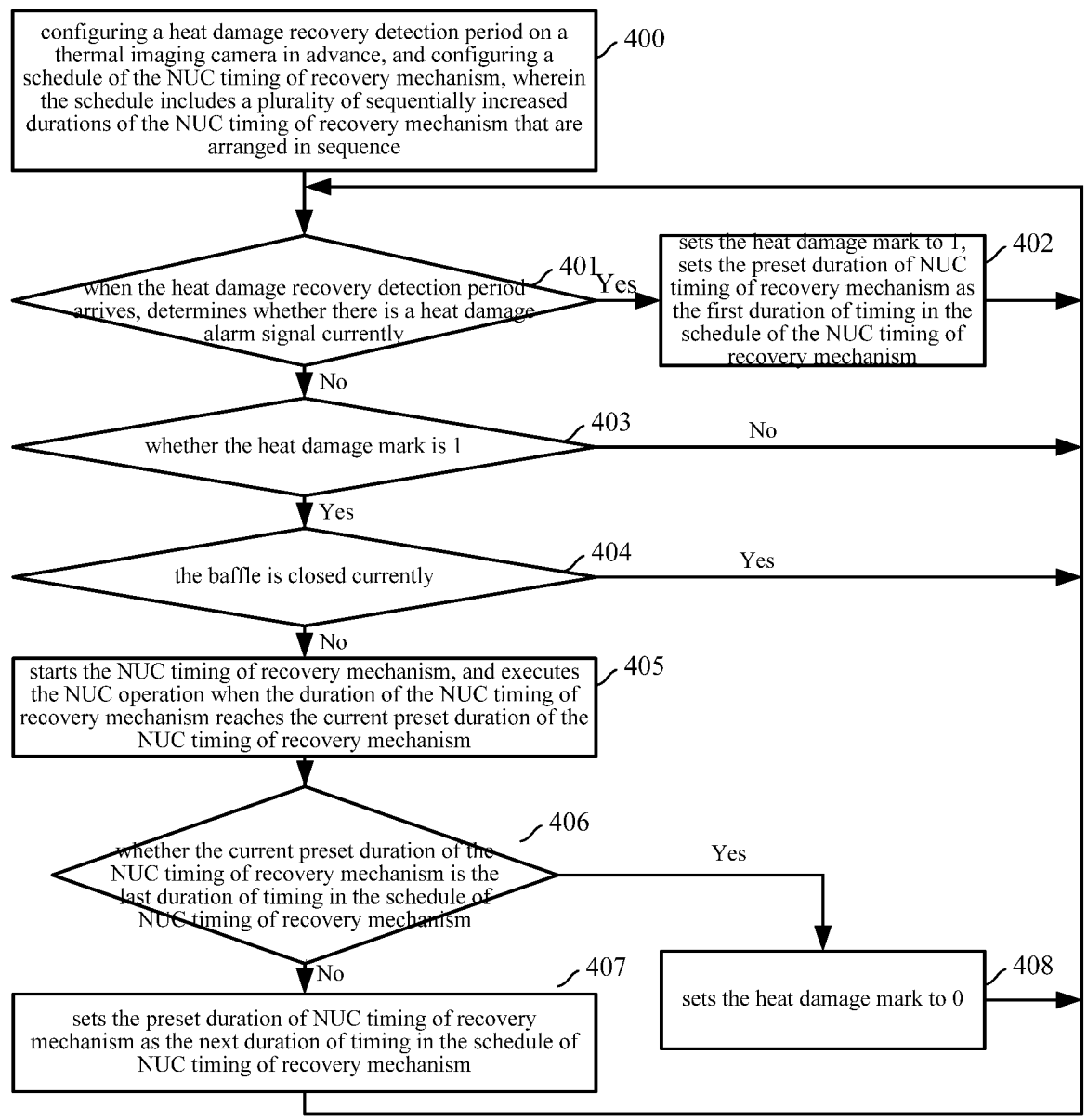
FIG. 4 is a second flow chart of a method for recovering from a heat damage of a thermal imaging camera provided by embodiments of the present application.

FIG. 4 is a second flow chart of a method for recovering from a heat damage of a thermal imaging camera provided by embodiments of the present application, and the specific steps are as follows:

Step 400: configuring a heat damage recovery detection period on a thermal imaging camera in advance, and configuring a schedule of the NUC timing of recovery mechanism, wherein the schedule includes a plurality of sequentially increased durations of the NUC timing of recovery mechanism that are arranged in sequence.

The number of the durations of the NUC timing of recovery mechanism and the value of each duration of timing specifically included in the schedule of the NUC timing of recovery mechanism can be judged according to the material characteristics of the image sensor of the thermal imaging camera.

For two adjacent durations of timing in the schedule of the NUC timing of recovery mechanism, the latter duration of timing is always greater than the former duration of timing. Each time the image sensor executes the NUC process under the recovery mechanism, it indicates that the image sensor material has been recovered for a period of time, and the recovery speed of the image sensor material will slow down with the extension of the recovery time. In the embodiments of the application, the duration of timing in the schedule of the NUC timing of recovery mechanism is arranged in an increasing order, so that the times of opening and closing the baffles can be reduced, and the service life of the baffles can be prolonged.

Step 401: when the heat damage recovery detection period arrives, the thermal imaging camera judges whether there is a heat damage alarm signal currently, and if yes, execute step 402; otherwise, execute step 403.

The heat damage recovery detection period may be set to be the same as the heat damage prevention detection period.

The heat damage alarm signal is set to 0 when the baffle is opened from closed, according to step 307.

Step 402: the thermal imaging camera sets the heat damage mark to 1, sets the preset duration of the NUC timing of recovery mechanism as the first duration of timing in the schedule of the NUC timing of recovery mechanism, and returns to step 401.

Here, setting the heat damage mark to 1 means setting the heat damage mark.

Step 403: the thermal imaging camera judges whether the heat damage mark is 1, if yes, execute step 404; otherwise, return to step 401.

Step 404: the thermal imaging camera judges whether the baffle is closed currently, if yes, return to the step 401; otherwise, execute step 405.

In the embodiments of the present application, for the thermal imaging camera using the single-position baffle, since the baffle is open, the step 404 does not need to be executed, that is, when it is judged that the heat damage mark is 1 in the step 403, the step 405 is directly executed.

Step 405: the thermal imaging camera starts the NUC timing of recovery mechanism, and executes the NUC operation when the duration of the NUC timing of recovery mechanism reaches the current preset duration of the NUC timing of recovery mechanism.

Step 406: the thermal imaging camera judges whether the current preset duration of the NUC timing of recovery mechanism is the last duration of timing in the schedule of the NUC timing of recovery mechanism, if yes, execute step 408; otherwise, execute step 407.

Step 407: the thermal imaging camera sets the preset duration of the NUC timing of recovery mechanism as the next duration of timing in the schedule of the NUC timing of recovery mechanism, and returns to step 401.

Step 408: the thermal imaging camera sets the heat damage mark to 0 and returns to step 401.

Setting the heat damage mark to 0 means that the heat damage recovery process has been completed. Setting the heat damage mark to 0 is to clear the heat damage mark.

The embodiment shown in FIG. 4 is suitable for both thermal imaging camera using dual-position baffle and thermal imaging camera using single-position baffle.

Through the above embodiments, after detecting that a high-temperature object enters the image picture of the thermal imaging camera, a heat damage alarm signal is generated, the heat damage mark is set, and the NUC operation is executed after the high-temperature object leaves the picture, so that the problem of abnormal image pictures and inaccurate temperature measurement caused by the change of material characteristics of the image sensor is corrected.

In addition, considering that the recovery speed of the image sensor material will slow down with the extension of the recovery time, a schedule of the NUC timing of recovery mechanism containing a plurality of sequentially increased durations of timing that are arranged in sequence is arranged, such that the times of opening and closing the barrier blades are reduced, and the service life of the barrier blades is prolonged.

Figure 5:
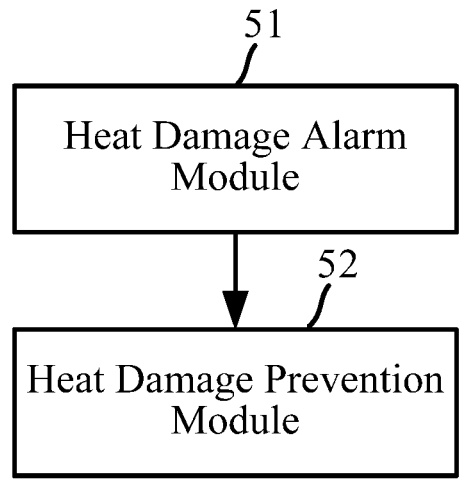
FIG. 5 is a schematic diagram of a first configuration of an apparatus for preventing heat damage to a thermal imaging camera provided by an embodiment of the present application.

FIG. 5 is a schematic diagram of a first configuration of an apparatus for preventing heat damage to a thermal imaging camera provided by an embodiment of the present application, the device mainly includes: a heat damage alarm module 51 and a heat damage prevention module 52, wherein:

the heat damage alarm module 51 is configured to obtain a thermal imaging picture of the thermal imaging camera, detect whether the thermal imaging picture shows that a high-temperature object appears in a picture of the thermal imaging camera, and generate a heat damage alarm signal when it is confirmed that the thermal imaging picture shows that the high-temperature object appears in the picture;

the heat damage prevention module 52 is configured to close a baffle in case that the baffle of the thermal imaging camera is not closed currently when the heat damage alarm module 51 generates a heat damage alarm signal.

In an embodiment of the present application, the heat damage prevention module 52 may be further configured to: after confirming that the thermal imaging picture shows that a high-temperature object appears in the picture, start a NUC timing of protection mechanism, and execute NUC operation when the duration of the NUC timing of protection mechanism reaches a preset duration of the NUC timing of protection mechanism.

In an embodiment of the present application, the heat damage prevention module 52 can be further configured to:

A) when a user sets the state of the baffle, judge whether a current actual state of the baffle is consistent with a state of the baffle set by the user, if not, change the current actual state of the baffle to the state of the baffle set by the user, and turn to step B; if yes, directly turn to step B;

B) judge whether the current actual state of the baffle is a closed state, if yes, start a NUC timing of protection mechanism, and execute NUC operation when the duration of the NUC timing of protection mechanism reaches the preset duration of the NUC timing of protection mechanism.

In an embodiment of the present application, the heat damage prevention module 52 may be further configured to: before the baffle is closed under the condition that the baffle is not closed currently, detect whether the heat damage alarm module 51 generates a heat damage alarm signal according to the heat damage prevention detection period; and if no heat damage alarm signal generated by the heat damage alarm module 51 is detected when the heat damage prevention detection period arrives, the baffle is opened under the condition that the current baffle is closed.

In an embodiment of the present application, the heat damage prevention module 52 may be further configured to: after confirming that the thermal imaging picture shows that a high-temperature object appears in the picture, start a closing timing, and open the baffle and eliminate the heat damage alarm signal when the duration of the closing timing reaches a preset duration of closing.

In an embodiment of the present application, the heat damage alarm module 51 may be further configured to eliminate the heat damage alarm signal when it is detected that the baffle of the thermal imaging camera is turned from closed to open; and the heat damage prevention module 52 is further configured to, when the heat damage alarm signal of the heat damage alarm module 51 is eliminated, start the NUC timing of recovery mechanism if the current baffle is in an open state, and execute the NUC operation when the duration of the NUC timing of recovery mechanism reaches the preset duration of the NUC timing of recovery mechanism.

In an embodiment of the present application, the heat damage prevention module 52 may be further configured to: after a heat damage alarm signal is generated, start a NUC timing of recovery mechanism if the current baffle is in an open state when the heat damage alarm signal is eliminated, and execute the NUC operation when the duration of the NUC timing of recovery mechanism reaches the preset duration of the NUC timing of recovery mechanism.

In an embodiment of the present application, the heat damage prevention module 52 may be further configured to:

when the heat damage alarm module 51 generates a heat damage alarm signal, set a heat damage mark, and set the preset duration of the NUC timing of recovery mechanism as a first duration of timing in the preset schedule of the NUC timing of recovery mechanism, wherein the preset schedule of the NUC timing of recovery mechanism includes a plurality of sequentially increased durations of timing that are arranged in sequence;

and when the heat damage alarm signal of the heat damage alarm module 51 is eliminated, judge whether there is a heat damage mark, and if yes, execute the step of starting the NUC timing of recovery mechanism if the current baffle is in the open state;

and after executing the NUC operation when the duration of the NUC timing of recovery mechanism reaches the preset duration of the NUC timing of recovery mechanism, judge whether the duration of the current NUC timing of recovery mechanism is the last duration of timing in the preset schedule of the NUC timing of recovery mechanism; if yes, eliminate the heat damage mark; otherwise, set the current duration of the NUC timing of recovery mechanism as the next duration of timing in the preset schedule of the NUC timing of recovery mechanism, and judge whether the heat damage alarm module 51 generates a heat damage alarm signal; and if not, return to the step of judging whether there is a heat damage mark.

In an embodiment of the present application, the heat damage prevention module 52 may be further configured to:

after confirming that the thermal imaging picture shows that a high-temperature object appears in the picture, set a heat damage mark, and set a preset duration of the NUC timing of recovery mechanism as a first duration of timing in a preset schedule of the NUC timing of recovery mechanism, wherein the preset schedule of the NUC timing of recovery mechanism includes a plurality of sequentially increased durations of timing that are arranged in sequence;

and when the heat damage alarm signal is eliminated, judge whether there is a heat damage mark, if yes, execute the step of starting the NUC timing of recovery mechanism if the current baffle is in an open state;

and after executing the NUC operation when the duration of the NUC timing of recovery mechanism reaches the preset duration of the NUC timing of recovery mechanism, judge whether a current duration of the NUC timing of recovery mechanism is a last duration of timing in the preset schedule of the NUC timing of recovery mechanism; if yes, eliminate the heat damage mark; otherwise, set the duration of the current NUC timing of recovery mechanism as the next duration of timing in the preset schedule of the NUC timing of recovery mechanism, and judge whether the thermal imaging camera generates a heat damage alarm signal; and if not, return to the step of judging whether there is a heat damage mark.

Figure 6:
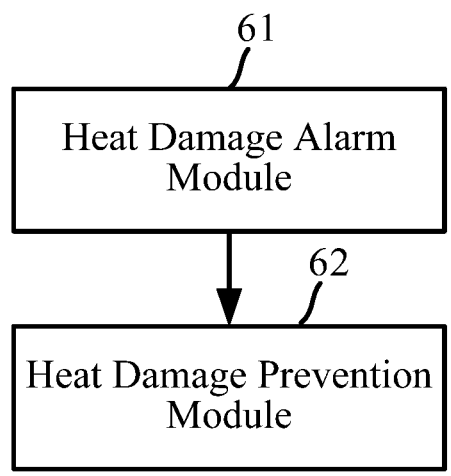
FIG. 6 is a schematic diagram of a second configuration of an apparatus for preventing heat damage to a thermal imaging camera provided by another embodiment of the present application.

FIG. 6 is a schematic diagram of a second configuration of an apparatus for preventing heat damage to a thermal imaging camera provided by an embodiment of the present application, the device mainly includes: a heat damage alarm module 61 and a heat damage prevention module 62, wherein:

the heat damage alarm module 61 is configured to obtain a thermal imaging picture of the thermal imaging camera, detect whether thermal imaging picture shows that a high-temperature object appears in a picture of the thermal imaging camera, and generate a heat damage alarm signal when it is confirmed that the thermal imaging picture shows that the high-temperature object appears in the picture; and eliminate the heat damage alarm signal when it detects that the baffle of the thermal imaging camera turns from closed to open.

The heat damage prevention module 62 is configured to, when the heat damage alarm signal of the heat damage alarm module 61 is eliminated, start the NUC timing of recovery mechanism if the current baffle is in an open state, and execute the NUC operation when the duration of the NUC timing of recovery mechanism reaches the preset duration of the NUC timing of recovery mechanism.

In an embodiment of the present application, the heat damage prevention module 62 may be further configured to, when the heat damage alarm module 61 generates a heat damage alarm signal, set a heat damage mark, and set the preset duration of the NUC timing of recovery mechanism as a first duration of timing in the preset schedule of the NUC timing of recovery mechanism, wherein the preset schedule of the NUC timing of recovery mechanism includes a plurality of sequentially increased durations of timing that are arranged in sequence;

and when the heat damage alarm signal of the heat damage alarm module 61 is eliminated, judge whether there is a heat damage mark, and if yes, execute the step of starting the NUC timing of recovery mechanism if the current baffle is in the open state;

and after executing the NUC operation when the duration of the NUC timing of recovery mechanism reaches the preset duration of the NUC timing of recovery mechanism, judge whether the current preset duration of the NUC timing of recovery mechanism is the last duration of timing in the preset schedule of the NUC timing of recovery mechanism; if yes, eliminate the heat damage mark; otherwise, set the preset duration of the NUC timing of recovery mechanism as the next duration of timing in the preset schedule of the NUC timing of recovery mechanism, and judge whether the heat damage alarm module 61 generates a heat damage alarm signal; and if not, return to the step of judging whether there is a heat damage mark.

Embodiments of the present application also provide a non-transitory computer readable storage medium storing instructions that, when executed by a processor, cause the processor to execute the steps of the method as described in any of FIGS. 1 to 4.

Embodiments of the present application also provide a thermal imaging camera including the non-transitory computer readable storage medium as described above and the above processor that can access the non-transitory computer readable storage medium. A non-transitory computer readable storage medium stores instructions that, when executed by a processor, cause the processor to execute the steps of the method as described in any of FIGS. 1 to 4.

Embodiments of the present application further provide a computer program, which when executed by a processor causes the processor to execute the steps of the method as described in any one of FIGS. 1 to 4.

It should be noted that, herein, relational terms such as first and second, and the like are used merely to distinguish one entity or action from another entity or action without necessarily requiring or implying any such actual relationship or order between such entities or actions. Moreover, the terms "include", "comprise" or any other variation thereof are intended to cover a non-exclusive inclusion, such that a process, method, article, or apparatus including a series of elements not only include those elements but also include other elements not explicitly listed or inherent to such process, method, article, or apparatus. Without further limitation, the element defined by the sentence "including a . . . " does not exclude the existence of other identical elements in the process, method, article, or apparatus that includes the element.

All the embodiments in the present specification are described in a related manner, and the same or similar parts among the embodiments can be referred to each other, and each embodiment focuses on differences from other embodiments. In particular, the device, thermal imaging camera, computer readable storage medium, and computer program product embodiments are relatively simple to describe as they are substantially similar to the method embodiments, and reference may be made in the pertinent part to the description of the method embodiments.

The above are only preferred embodiments of the present application and are not intended to limit the present application, and any modifications, equivalents, improvements and the like made within the spirit and principle of the present application shall be included in the protection scope of the present application.

What is claimed is:

1. A method for preventing heat damage to a thermal imaging camera,
wherein the method comprises:
obtaining a thermal imaging picture of the thermal imaging camera;
detecting whether the thermal imaging picture shows that a high-temperature object appears in the picture of the thermal imaging camera;
confirming that the thermal imaging picture shows that a high-temperature object appears in the picture, generating a heat damage alarm signal, and closing a baffle if the baffle is not closed currently;
wherein after confirming that the thermal imaging picture shows that a high-temperature object appears in the picture, the method further comprises: starting a non-uniformity correction timing of protection mechanism, and executing a non-uniformity correction operation when a duration of the non-uniformity correction timing of protection mechanism reaches a preset duration of the non-uniformity correction timing of protection mechanism.

2. The method according to claim 1, wherein after generating a heat damage alarm signal, the method further comprises:
   A) when a user sets a state of the baffle, judging whether a current actual state of the baffle is consistent with the state of the baffle set by the user, if not, changing the current actual state of the baffle to the state of the baffle set by the user, and turning to step B; if yes, directly turning to step B;
   B) judging whether the current actual state of the baffle is a closed state, if yes, starting a non-uniformity correction timing of protection mechanism, and executing non-uniformity correction operation when the duration of the non-uniformity correction timing of protection mechanism reaches the preset duration of the non-uniformity correction timing of protection mechanism.

3. The method according to claim 1, wherein, before closing a baffle if the baffle is not closed currently, the method further comprises: detecting whether the thermal imaging camera generates a heat damage alarm signal according to a heat damage prevention detection period;
   and, the method further comprises:
   if no heat damage alarm signal generated by the thermal imaging camera is detected when the heat damage prevention detection period arrives, opening the baffle under the condition that the current baffle is closed.

4. The method according to claim 1, wherein after confirming that the thermal imaging picture shows that a high-temperature object appears in the picture, the method further comprises: starting a closing timing, and opening the baffle and eliminating the heat damage alarm signal when a duration of the closing timing reaches a preset duration of closing.

5. The method according claim 1, wherein the baffle is a dual-position baffle.

6. The method according to claim 1, wherein after generating a heat damage alarm signal, the method further comprises:
   starting a non-uniformity correction timing of recovery mechanism if the current baffle is in an open state when the heat damage alarm signal is eliminated, and executing a non-uniformity correction operation when a duration of the non-uniformity correction timing of recovery mechanism reaches a preset duration of the non-uniformity correction timing of recovery mechanism.

7. The method according to claim 6, wherein the method further comprises:
   after confirming that the thermal imaging picture shows that a high-temperature object appears in the picture, setting a heat damage mark, and setting the preset duration of the non-uniformity correction timing of recovery mechanism as a first duration of timing in a preset schedule of the non-uniformity correction timing of recovery mechanism, wherein the preset schedule of the non-uniformity correction timing of recovery mechanism comprises a plurality of sequentially increased durations of timing that are arranged in sequence;
   and when the heat damage alarm signal is eliminated, judging whether there is a heat damage mark, if yes, executing the step of starting the non-uniformity correction timing of recovery mechanism if the current baffle is in an open state;
   and after executing the non-uniformity correction operation when a duration of the non-uniformity correction timing of recovery mechanism reaches a preset duration of the non-uniformity correction timing of recovery mechanism, judging whether a current duration of the non-uniformity correction timing of recovery mechanism is a last duration of timing in the schedule of the preset non-uniformity correction timing of recovery mechanism; if yes, eliminating the heat damage mark; otherwise, setting the current duration of the non-uniformity correction timing of recovery mechanism as a next duration of timing in the preset schedule of the non-uniformity correction timing of recovery mechanism, and judging whether the thermal imaging camera generates a heat damage alarm signal; and if the thermal imaging camera does not generate a heat damage alarm signal, returning to the step of judging whether there is a heat damage mark.

8. A thermal imaging camera, comprising a non-transitory computer-readable storage medium and a processor that can access the non-transitory computer-readable storage medium, the non-transitory computer-readable storage medium stores instructions that, when executed by a processor, cause the processor to execute operations comprising:
   obtaining a thermal imaging picture of the thermal imaging camera;
   detecting whether the thermal imaging picture shows that a high-temperature object appears in the picture of the thermal imaging camera;
   confirming that the thermal imaging picture shows that a high-temperature object appears in the picture, generating a heat damage alarm signal, and closing a baffle if the baffle is not closed currently;
   after confirming that the thermal imaging picture shows that a high-temperature object appears in the picture, starting a non-uniformity correction timing of protection mechanism, and executing a non-uniformity correction operation when a duration of the non-uniformity correction timing of protection mechanism reaches a preset duration of the non-uniformity correction timing of protection mechanism.

9. A non-transitory computer-readable storage medium, wherein the non-transitory computer-readable storage medium stores instructions that, when executed by a processor, cause the processor to execute steps of the method of claim 1.

10. The thermal imaging camera according to claim 8, wherein the processor is caused to execute operations of:
after generating a heat damage alarm signal,
   A) when a user sets a state of the baffle, judging whether a current actual state of the baffle is consistent with the state of the baffle set by the user, if not, changing the current actual state of the baffle to the state of the baffle set by the user, and turning to step B; if yes, directly turning to step B;
   B) judging whether the current actual state of the baffle is a closed state, if yes, starting a non-uniformity correction timing of protection mechanism, and executing non-uniformity correction operation when the duration of the non-uniformity correction timing of protection mechanism reaches the preset duration of the non-uniformity correction timing of protection mechanism.

11. The thermal imaging camera according to claim 8, wherein the processor is caused to execute operations of: before closing a baffle if the baffle is not closed currently, detecting whether the thermal imaging camera generates a heat damage alarm signal according to a heat damage prevention detection period;

and if no heat damage alarm signal generated by the thermal imaging camera is detected when the heat damage prevention detection period arrives, opening the baffle under the condition that the current baffle is closed.

12. The thermal imaging camera according to claim 8, wherein the processor is caused to execute operations of: after confirming that the thermal imaging picture shows that a high-temperature object appears in the picture, starting a closing timing, and opening the baffle and eliminating the heat damage alarm signal when a duration of the closing timing reaches a preset duration of closing.

13. The thermal imaging camera according to claim 8, wherein the baffle is a dual-position baffle.

14. The thermal imaging camera according to claim 8, wherein the processor is caused to execute operations of: after generating a heat damage alarm signal, starting a non-uniformity correction timing of recovery mechanism if the current baffle is in an open state when the heat damage alarm signal is eliminated, and executing a non-uniformity correction operation when a duration of the non-uniformity correction timing of recovery mechanism reaches a preset duration of the non-uniformity correction timing of recovery mechanism.

15. The thermal imaging camera according to claim 14, wherein the processor is caused to execute operations of:

after confirming that the thermal imaging picture shows that a high-temperature object appears in the picture, setting a heat damage mark, and setting the preset duration of the non-uniformity correction timing of recovery mechanism as a first duration of timing in a preset schedule of the non-uniformity correction timing of recovery mechanism, wherein the preset schedule of the non-uniformity correction timing of recovery mechanism comprises a plurality of sequentially increased durations of timing that are arranged in sequence;

and when the heat damage alarm signal is eliminated, judging whether there is a heat damage mark, if yes, executing the step of starting the non-uniformity correction timing of recovery mechanism if the current baffle is in an open state;

and after executing the non-uniformity correction operation when a duration of the non-uniformity correction timing of recovery mechanism reaches a preset duration of the non-uniformity correction timing of recovery mechanism, judging whether a current duration of the non-uniformity correction timing of recovery mechanism is a last duration of timing in the schedule of the preset non-uniformity correction timing of recovery mechanism; if yes, eliminating the heat damage mark; otherwise, setting the current duration of the non-uniformity correction timing of recovery mechanism as a next duration of timing in the preset schedule of the non-uniformity correction timing of recovery mechanism, and judging whether the thermal imaging camera generates a heat damage alarm signal; and if the thermal imaging camera does not generate a heat damage alarm signal, returning to the step of judging whether there is a heat damage mark.

\* \* \* \* \*